United States Patent Office 3,393,232
Patented July 16, 1968

3,393,232
PROCESS FOR THE PRODUCTION OF α-ETHYLENICALLY UNSATURATED MONOCARBOXYLIC ACIDS
Françoise Lanos, Paris, and Geneviève Clement, Coeuilly-Champigny, France, assignors to Institut Français du Pétrole, des Carburants et Lubrifiants, Rueil-Malmaison, France
No Drawing. Filed June 29, 1965, Ser. No. 468,164
Claims priority, application France, June 30, 1964, 980,234
12 Claims. (Cl. 260—530)

ABSTRACT OF THE DISCLOSURE

In the production of α-ethylenically unsaturated monocarboxylic acids by oxidizing the corresponding α-ethylenically unsaturated aldehydes, the employment of neutral phosphoric acid esters for preventing polymerization of the double bonds of either the aldehyde or the acid, said process being conducted in the optional presence of an olefinic hydrocarbon as the solvent, and wherein epoxides are produced from said olefins, simultaneously with the production of the desired acids.

---

This invention relates to a process for the production of monocarboxylic acids wherein an ethylene unsaturation appears between the α- and β-carbon atoms in relationship to the carboxylic acid moiety.

The oxidation of α,β-unsaturated aldehydes, particularly ethylenically unsaturated aldehydes can be conducted in the liquid phase by passing molecular oxygen therethrough to yield α-ethylenically unsaturated monocarboxylic acids. This process would be of more industrial interest if the oxidation were not accompanied by the formation of polymers, the presence of which not only results in the reduction of the acid yield, but also presents difficult problems with respect to the withdrawal and fractionation of the reaction mixture. Furthermore, it is difficult to avoid a reaction of the ethylenic double bond in the starting aldehyde material or in the produced acid, this fact being indicated in United States Patent No. 2,600,054 of July 26, 1947.

A principal object of the present invention, therefore, is to provide an improved process for the production of α-ethylenically unsaturated monocarboxylic acids, in which the precedingly described disadvantages are either eliminated or at the very least substantially reduced.

Another object is to provide a process for the simultaneous production of epoxides and α-ethylenically unsaturated acids.

Upon further study of the specification and claims, other objects and advantages of the present invention will become apparent.

To attain the objects of this invention, a process is provided wherein the reaction is conducted in the presence of a neutral phosphoric acid ester. The expression "neutral ester" is intended to define phosphoric acid esters wherein all the acid functions are esterified.

The preferred phosphoric acid esters correspond to the following formula:

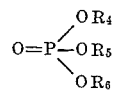

wherein the radicals $R_4$, $R_5$ and $R_6$ are identical or different and represent alkyl, cycloalkyl, aryl, or arylalkyl, either all hydrocarbon in nature or substituted by moieties which do not deleteriously interfere with the reaction. It is preferable and advantageous for these radicals to contain 1–18 carbon atoms, more preferably 3–12 carbon atoms.

Among the wide variety of phosphates that can be employed in this invention, the following specific compounds are particularly useful: trimethyl orthophosphate, triethyl orthophosphate, triisopropyl orthophosphate, tributyl orthophosphate, tridodecyl orthophosphate, tribenzyl orthophosphate, triphenyl orthophosphate, tricresyl (or-tho, meta or para) orthophosphate, tricyclohexyl orthophosphate, tri-(methyl - 4 - cyclohexyl) orthophosphate, phenyldimethyl orthophosphate, and dibenzylethyl orthophosphate.

From the standpoint of obtaining the best yields of acids, it is preferred that the reaction be conducted in a solvent or mixture of solvents. From a chemical standpoint, the main criterion of the solvent is that it does not deleteriously interfere with the formation of the desired α-ethylenically unsaturated monocarboxylic acids. Preferred solvents are esters, tertiary alcohols, saturated or aromatic hydrocarbons, as well as liquid olefinic compounds, particularly olefinic hydrocarbons.

As long as the other solvents are inert, or substantially inert, the olefinic compounds are convertible into their corresponding epoxides with an excellent yield. Thus, it is possible to simultaneously combine the production of epoxides on the one hand with the production of α-ethylenically unsaturated monocarboxylic acids on the other hand. Not only does this process provide considerable savings, as compared to separate processes, but also the epoxides obtained in this manner can be produced at much lower temperatures than conventionally employed in the prior art.

Among the esters that can be employed as the solvent, it is preferred to use those esters which are reaction products of a saturated aliphatic, saturated cycloaliphatic, or aromatic carboxylic acid, on the one hand, and a saturated alcohol, on the other hand, having an aliphatic, cycloaliphatic or arylaliphatic organic moiety attached thereto. Such esters preferably contain 3–20 carbon atoms. Particularly suitable esters include methyl acetate, ethyl acetate, butyl acetate, cyclohexyl acetate, ethyl butyrate, ethyl caproate, methyl benzoate, ethyl benzoate, benzyl acetate, ethyl succinate, methyl adipate, and the diethyl ester of orthophthalic acid.

As a tertiary alcohol which can be employed as the solvent, there can be utilized, for example, tertiary butyl alcohol or tertiary octyl alcohol. In general, it is preferred that the tertiary alcohol be a hydrocarbon tertiary alcohol containing up to about 16 carbon atoms.

With respect to hydrocarbons that can be employed as solvents, it is preferred that they be inert or substantially inert at slightly elevated temperatures, that is, less than about 100° C. It is also important, of course, that the hydrocarbons exist in the liquid phase, and under certain circumstances it may be preferable to employ a normally gaseous material and place it under sufficient pressure to maintain it in the liquid phase. As specific examples of substantially inert hydrocarbons which are suitable as solvents for this invention, the following are set forth: propane, butane, pentane, hexane, cyclohexane, octane, cetane, toluene, xylenes, as well as mixtures thereof or mixtures with other solvents. Benzene, which is highly resistant to oxidation, can be employed at temperatures even higher than 100° C. Generally, such saturated hydrocarbons contain 3 to about 20 carbon atoms; aromatic hydrocarbons, on the other hand, preferably contain 6 to 8 carbon atoms.

The neutral phosphoric acid ester can be employed in extremely variable proportions, for example at a proportion of 0.001 to 10 parts by weight of ester to 1 part by weight of aldehyde. However, the preferred proportions correspond to about 0.1 to 10 parts, particularly 0.2 to 1 part of ester to 1 part of aldehyde. Using the preferred proportions, it is possible to substantially completely avoid the polymerization reaction which heretofore was always associated with the production of the acid.

With respect to the reaction milieu, it is possible to utilize the reaction without the use of a solvent, but when a solvent is employed it is preferred that the aldehyde concentration be about 0.4 to 8 moles per liter of solvent, preferably 1 to 4 moles per liter.

As the aldehyde which is used as the starting material, is is possible to employ, for example, compounds of the following formula:

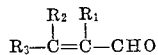

wherein $R_1$, $R_2$ and $R_3$ are identical or different and represent monovalent atoms such as, for example, hydrogen, or for that matter any other inert atom which does not interfere with the reaction. Additionally, $R_1$, $R_2$ and $R_3$ can represent monovalent radicals which do not interfere with the reaction, being preferably hydrocarbons which are optionally substituted by other moieties, but most preferably alkyl radicals of 1–4 carbon atoms.

The acids which are obtained according to this invention correspond to the following formula:

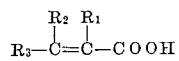

wherein $R_1$, $R_2$ and $R_3$ have the previously indicated significance.

As specific preferred examples of the aldehydes and corresponding acids which are employed in this invention, there can be mentioned acrolein which yields acrylic acid, methacrolein which yields methacrylic acid, and crotonic aldehyde which yields crotonic acid.

The reaction is conducted at a moderate temperature, for example between 20 and 150° C., preferably between 30 and 100° C. under sufficient pressure to maintain a liquid phase and with an appreciable proportion of aldehyde. On the other hand, the reaction can be conducted at lower or higher temperatures and at subatmospheric, atmospheric, or superatmospheric pressures while still obtaining the benefits of the introduction of the neutral phosphoric ester of this invention. With respect to pressure, however, it is preferable to employ total pressures on the order of 1–20 kg./cm.², merely for the sake of convenience.

As a preferred embodiment of the process of this invention, it is generally advantageous to interrupt the reaction before the initial aldehyde is totally converted. Thus, it is preferred that the reaction be terminated before the rate of conversion of the aldehyde reaches 70%, more preferably before 50%. As a preferred range of conversion rates, 30–50% is particularly practical. The unconverted aldehyde can then be recycled.

With respect to the oxygen which is employed as the reactant in the process of this invention, it is of course desirable to utilize its cheapest source, air; but under certain circumstances it may be preferable to employ higher or lower oxygen concentrations. Thus, pure oxygen can be used by itself or diluted with an inert gas. Furthermore, air itself can be further diluted with additional inert gas.

With respect to the possibility of employing oxidation catalysts, it has been discovered that highly active oxidation catalysts, such as cobalt or manganese salts, generally favor the polymerization reaction, rather than the production of α-ethylenically unsaturated monocarboxylic acids. Thus, the employment of such active catalysts in this invention offers more disadvantages than advantages and is generally to be avoided. In contrast, however, less active catalysts, such as iron, copper or nickel salts accelerate the reaction without any unfavorable polymerization side effects. Preferred specific examples of these less active salts include: nickel stearate, nickel acetate, iron naphthenate, copper butyrate, copper oleate, iron palmitate, iron octanoate and nickel octanoate.

The reaction time in general is less than 3 hours, being for example about 5 to 60 minutes. It is to be understood, however, that longer reaction times can be employed, though unnecessary, and conversely shorter reaction times, though yielding a finite amount of product, are not practical from an economic standpoint.

The resultant acid which is produced by the process of this invention can be recovered by any conventional process, for example by extracting the acid with an aqueous solution of a base, such as sodium or potassium hydroxide and a subsequent acidification of the aqueous layer, or by salting out the acid, or by distillation. In any event, it is preferable to employ a polymerization inhibitor in any subsequent recovery step, such inhibitors being preferably, for example, cuprous chloride, hydroquinone or pyrogallol.

As previously mentioned, a particularly advantageous and preferred embodiment of this invention comprises the use of an epoxidizable olefinic compound, other than aldehyde, such as an olefinic hydrocarbon or a halogenated derivative thereof. This compound contains at least 3 carbon atoms and preferably not more than 18 carbon atoms per molecule. As preferred specific examples of such olefinic compounds, there are included 1-butene, 2-butene, propylene, isobutene, pentenes, hexenes, hexadecenes, cyclopentene, cyclooctene, cyclohexene, methyl cyclohexene, and allyl chloride. In any event, it is to be emphasized at this point that α-ethylenically unsaturated hydrocarbons are particularly preferred. Furthermore, mixtures of these olefinic compounds can also be employed.

When such olefinic compounds are utilized, it is preferable to use 0.05 to 5, particularly 0.1 to 0.4 mole of aldehyde per mole of olefinic compound, and to limit the conversion of the olefinic compound to a rate lower than 90%. In addition, it is advantageous to utilize one of the inert solvents mentioned previously, or an equivalent inert solvent, so as to provide a concentration of the olefinic compound lower than 50% by weight, preferably lower than 25% by weight. A particularly preferred concentration of the olefinic compound is 2 to 25% by weight, all weights being based on the total solution.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

Into an autoclave there are introduced 560 g. acrolein, 1630 cc. benzene, 200 g. tributyl orthophosphate, and 0.4 g. nickel stearate. The temperature is raised to 65° C. and a current of oxygen maintained at a total pressure of 6 kg./cm.² is passed through the reaction milieu for 45 minutes, the oxygen absorption attaining a value of 1.9 moles.

After cooling, and releasing the pressure, the reaction product is analyzed. 28% of the initial acrolein is converted, thereby resulting in 176 g. of acrylic acid, corresponding to a molar yield of 87.5%. From the standpoint of ease of handling, it is important to note that the reaction mixture remains fluid.

After the acrylic acid is separated, the reaction milieu can be recharged with acrolein, and recycled to the reaction zone.

Example 2

Example 1 is repeated, except that nickle stearate is nnot used. As a consequence thereof, the conversion of 28% of the starting acrolein requires a reaction time of 85 minutes instead of 45 minutes.

Example 3

Operating in accordance with Example 1, oxygen is reacted with a mixture of 560 g. acrolein, 1780 cc. hexane, and 50 g. tributyl orthophosphate. After 120 minutes, there is obtained an acrolein conversion of 38% and a molar yield of acrylic acid of 79%, the reaction milieu remaining liquid. The total consumption of oxygen in this case reaches a value of 1.8 mole.

Example 4

Operating as in Example 1, oxygen is reacted with a mixture of 560 g. acrolein, 1430 cc. benzene, and 400 g. tributyl phosphate. After 110 minutes, a conversion of 44.2% of the acrolein is achieved, along with a molar yield of acrylic acid of 85.5%. Again, the reaction milieu remains fluid.

Example 5

Operating as in Example 1, but at a temperature of 70° C., 3 moles of oxygen are absorbed in 2 hours by mixture of 1730 cc. normal octane, 100 g. tributyl phosphate, and 560 g. acrolein. The conversion rate of acrolein is 53%, and the molar yield of acrylic acid is 70%.

Example 6

Example 1 is repeated, except that the nickel stearate is replaced by the same weight of cuprous stearate, and the tributyl phosphate is replaced by the same weight of tricresyl phosphate. Under these conditions, 2 moles of oxygen are absorbed in 65 minutes.

The conversion rate of acrolein is 30.9%, and the molar yield of acrylic acid is 96% (i.e., 173 g. consumed acrolein result in 213 g. acrylic acid). Furthermore, one cannot observe any formation of polymers.

Example 7

During the course of 35 minutes, 2.4 moles of oxygen are absorbed in a mixture of 685 g. methacrolein, 250 g. tributyl orthophosphate, and 1400 cc. toluene, at 54° C. and under a partial pressure of oxygen of 5 atmospheres. Upon analysis, it is found that the conversion rate of methacrolein is 22.5% (154 g. consumed) and that the molar yield of methacrylic acid is 76% (144 g.). Again, there is no observation of polymer formation.

Example 8

During the course of 18 minutes, 2.6 moles of oxygen are absorbed in a mixture of 700 g. crotonic aldehyde, 1650 cc. benzene, and 30 g. tricresyl orthophosphate, at 55° C. and under a partial pressure of oxygen of 5 kg./cm.$^2$. In consuming 388 g. crotonic aldehyde (conversion 55.3%), there are obtained 404 g. crotonic acid, representing a molar yield of 85%.

Example 9

During the course of 50 minutes, 2 moles of oxygen are absorbed in a mixture of 560 g. acrolein, 1830 cc. benzene, and 100 g. triphenyl phosphate, at 67° C. and under a partial pressure of oxygen of 5 atmospheres. The acrolein conversion rate is 32.5% (182 g. consumed); and the molar yield of acrylic acid is 92% (216 g.). Furthermore, there is no observation of polymer formation.

Example 10

Into an autoclave there are introduced 276 g. acrolein, 673 g. 1-hexene, 180 g. tributyl phosphate, and 970 cc. hexane. The autoclave is heated to a temperature of about 70° C., and then oxygen is passed through the reaction milieu for a period of one hour and a half at this temperature, the reaction milieu being maintained substantially saturated in this respect.

By distillation, there is recovered 614 g. of unconverted 1-hexane. The resultant reaction mixture remains very fluid, thereby indicating that polymer formation or byproduct formation is negligible to non-existent.

An analysis of the reaction mixture reveals that 98 g. acrylic acid and 52 g. epoxy-1,2-hexane are formed, and that 107 g. acrolein are consumed. The resultant products can be isolated by distillation, under a progressively reduced pressure in the presence of a polymerization inhibitor, such as cuprous chloride. The molar yield of hexane epoxide, with respect to the hexene converted, is 74% and that of the acrylic acid with respect to the acrolein transformed is 71%.

Example 11

Following the operating technique of Example 10, a mixture of 350 g. methacrolein, 420 g. propylene, 100 g. tricresyl phosphate, and 1140 cc. benzene are subjected to oxygen treatment for a period of 70 minutes at a temperature of 70° C. The resultant reaction mixture again remains fluid.

The molar yield of propylene oxide is 88%, and the molar yield of methacrylic acid is 69%. The conversion rate of methacrolein is 41% and that of propylene 8.2%.

Example 11a

For purposes of comparison, Example 11 is repeated, but this time with the elimination of tricresyl phosphate, all other things being equal. At the termination of the reaction, there is found a fluid liquid phase on the one hand and a viscous paste on the other hand. Upon analysis, the liquid phase indicates a content of 46.4 g. methacrylic acid and 28.4 g. epoxypropane, corresponding to molar yields of 45.7% and 79%, respectively.

Thus, by comparison, it is seen that the incorporation of tricresyl phosphate increases the molar yield of epoxypropane from 79% to 88%, and that of methacrylic acid from 45% to 69%, these increases being highly significant.

Example 12

In an autoclave there are mixed 118 cc. benzene, 76.5 g. allyl chloride, 20 g. tributyl phosphate, and 28 g. acrolein. This mixture is then subjected to oxygen treatment for a period of 130 minutes at 72° C. For a consumption of 6.8 g. allyl chloride and 11.4 g. acrolein, there are obtained 7.4 g. epichlorohydrin (molar yield 90%) and 12.6 g. acrylic acid (molar yield 86%).

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the production of α-ethylenically unsaturated hydrocarbon monocarboxylic acid of 3–15 carbon atoms which comprises passing oxygen through a liquid phase of α-ethylenically unsaturated hydrocarbon monoaldehyde of 3–15 carbon atoms, the improvement comprising adding to the liquid phase a neutral ester of phosphoric acid of the formula:

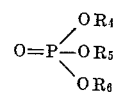

wherein $R_4$, $R_5$ and $R_6$ each represents alkyl, cycloalkyl, hydrocarbon aryl, or hydrocarbon arylalkyl radicals, said radicals being of not more than 18 carbon atoms each to prevent polymerization of the olefinically unsaturated compounds.

2. A process as defined by claim 1 wherein the neutral ester is employed in a ratio of 0.001–10 parts by weight per one part by weight of the monoaldehyde.

3. A process as defined by claim 2 wherein the aldehyde is acrolein, methacrolein, or crotonic aldehyde.

4. A process as defined by claim 1 wherein the neutral ester is employed in a ratio of 0.1–10 parts by weight per one part of monoaldehyde.

5. A process as defined by claim 1 wherein the reaction is conducted in an organic solvent substantially inert to the formation of said acid.

6. A process as defined by claim 5 wherein the solvent is an ester, a tertiary alcohol, a saturated hydrocarbon, or an aromatic hydrocarbon.

7. A process as defined by claim 1 wherein the aldehyde is acrolein, methacrolein, or crotonic aldehyde.

8. A process as defined by claim 7 wherein the neutral ester or phosphoric acid is trimethyl orthophosphate, triethyl orthophosphate, triisopropyl orthophosphate, tributyl orthophosphate, tridodecyl orthophosphate, tribenzyl orthophosphate, triphenyl orthophospate, tricresyl (orto, meta or para) orthophosphate, tricyclohexyl orthophosphate, tri - (methyl - 4 - cyclohexyl) orthophosphate, phenyldimethyl orthophosphate, or dibenzylethyl orthophosphate.

9. A process as defined by claim 1 wherein the reaction temperature is about 20–150° C.

10. A process as defined by claim 1 wherein the reaction temperature is 30–100° C.

11. A process as defined by claim 1 wherein the reaction is terminated before the conversion rate of the aldehyde reaches 70%.

12. A process as defined by claim 1 wherein the neutral ester of phosphoric acid is trimethyl orthophosphate, triethyl orthophosphate, triisopropyl orthophosphate, tributyl orthophosphate, tridodecyl orthophospate, tribenzyl orthophosphate, triphenyl orthophosphate, tricresyl (ortho, meta or para) orthophosphate, tricyclohexyl orthophosphate, tri-(methyl - 4 - cyclohexyl) orthophosphate, phenyldimethyl orthophosphate, or dibenzylethyl orthophosphate.

References Cited
UNITED STATES PATENTS

| | | | |
|---|---|---|---|
| 2,153,406 | 4/1939 | Bauer | 260—530 |
| 2,975,219 | 3/1961 | Starks | 260—652.5 |

LORRAINE A. WEINBERGER, *Primary Examiner.*

V. GARNER, *Assistant Examiner.*

UNITED STATES PATENT OFFICE
CERTIFICATE OF CORRECTION

Patent No. 3,393,232                          July 16, 1968

Françoise Lanos et al.

It is certified that error appears in the above identified patent and that said Letters Patent are hereby corrected as shown below:

Column 3, line 12, "is", first occurrence, should read -- it --. Column 4, line 71, "nickle" should read -- nickel --; line 72, "nnot" should read -- not --. Column 5, line 73, "hexane" should read -- hexene --. Column 6, line 7, "hexane", first occurrence, should read -- hexene --. Column 7, line 15, "or" should read -- of --; line 19, "orto" should read -- ortho --.

Signed and sealed this 17th day of February 1970.

(SEAL)
Attest:

Edward M. Fletcher, Jr.                      WILLIAM E. SCHUYLER, JR.
Attesting Officer                             Commissioner of Patents